United States Patent [19]
Mishima et al.

[11] Patent Number: 6,136,918
[45] Date of Patent: Oct. 24, 2000

[54] RUBBER LATEXES, GRAFT COPOLYMERS, AND THERMOPLASTIC RESIN COMPOSITIONS

[75] Inventors: Ikuhiro Mishima; Norito Doi; Youichi Matsumura; Shigemi Matsumoto; Shinobu Ochikoshi; Kazuhito Wada; Hiroki Yoshino, all of Hyogo, Japan

[73] Assignee: Kanegafuchi Kagaku Kogyo Kabushiki Kaisha, Osaka, Japan

[21] Appl. No.: 09/068,014

[22] PCT Filed: Dec. 13, 1995

[86] PCT No.: PCT/JP95/02548

§ 371 Date: Apr. 30, 1998

§ 102(e) Date: Apr. 30, 1998

[87] PCT Pub. No.: WO97/21770

PCT Pub. Date: Jun. 19, 1997

[51] Int. Cl.[7] .............................. C08L 21/02; C08L 33/06; C08L 51/04; C08F 291/02
[52] U.S. Cl. .......................... 524/804; 524/827; 524/828; 524/831; 524/832; 525/70; 525/71; 525/76; 525/78; 525/80
[58] Field of Search ...................................... 524/804, 827, 524/828, 831, 832; 525/70, 71, 76, 78, 80

[56] References Cited

U.S. PATENT DOCUMENTS

| | | |
|---|---|---|
| 3,944,630 | 3/1976 | Ide et al. . |
| 5,204,406 | 4/1993 | Fujii et al. ................................ 525/73 |
| 5,336,720 | 8/1994 | Richards et al. ........................ 525/78 |
| 5,510,399 | 4/1996 | Sauer ..................................... 523/335 |

FOREIGN PATENT DOCUMENTS

| | | |
|---|---|---|
| 58-63713 | 4/1983 | Japan . |
| 60-112811 | 6/1985 | Japan . |
| 60-118708 | 6/1985 | Japan . |
| 3-35048 | 2/1991 | Japan . |

*Primary Examiner*—Jeffrey C. Mullis
*Attorney, Agent, or Firm*—Armstrong, Westerman, Hattori, McLeland & Naughton

[57] ABSTRACT

A rubber latex with its particles grown through cohesion by adding 100 weight parts of (B) a rubber latex (solid), 0.1–15 weight parts (solid) of (A) an acid group-containing latex having an average particle size of 50–500 nm prepared by polymerizing a monomer mixture comprising (a), (b), (c) and (d) [wherein (a)+(b)+(c)+(d)=100 weight %]: (a) 5–25 weight % of at least one of unsaturated acids selected from the group consisting of acrylic acid, methacrylic acid, itaconic acid and crotonic acid, (b) 20–95 weight % of at least one of alkyl methacrylates with its alkyl group 1–12 in carbon number, (c) 0–30 weight % of at least one of alkyl acrylates with its alkyl group 1–12 in carbon number, (d) 0–40 weight % of at least one selected from the group consisting of aromatic vinyls, compounds having at least two polymerizable functional groups in a molecule and vinyl cyanides, copolymerizable with the aforementioned (a), (b) and (c) is provided. The rubber latex and a graft copolymer containing it and thermoplastic resins incorporating said graft copolymer are excellent in impact strength, heat resistance and workability.

14 Claims, No Drawings

RUBBER LATEXES, GRAFT COPOLYMERS, AND THERMOPLASTIC RESIN COMPOSITIONS

FIELD OF THE INVENTION

The present invention relates to a particle-grown rubber latex, a graft copolymer using it and a thermoplastic resin composition excelled in impact strength.

BACKGROUND OF THE INVENTION

Recently, there have been widely in use rubber-reinforced resins improved in impact strength through the blending with a graft copolymer obtained from the graft polymerization of a rubber polymer with a monomer capable of imparting compatibility with hitherto known thermoplastic resins such as polyvinyl chlorides, polystyrenes, polymethyl methacrylates, styrene-acrylonitrile copolymer resins, α-methylstyrene-acrylonitrile copolymer resins, styrene-acrylonitrile-phenylmaleimide copolymer resins, polyester resins, polycarbonate resins and polyamide resins, and polymer alloys of these resins such as alloys of styrene-acrylonitrile copolymer resins with polycarbonate resins and alloys of α-methylstyrene-acrylonitrile copolymer resins with vinyl chloride resins.

The rubber copolymer used for the preparation of such rubber-reinforced resins has an optimum range of particle size, which is generally known to be dependent on the kind of a matrix resin. It is said that a kind of rubber larger in particle size is required for polymers higher in brittleness and actually the average particle sizes of the rubbers in use range from 0.15 μm (150 nm) to several μm (several thousands nm).

Of the various kinds of rubbers used for the purpose, most widely in use are of diene type or of acrylic ester type.

The diene-type rubbers and acrylic ester-type rubbers are normally prepared by emulsion polymerization and are obtainable in latex form. The particle size of the rubbers obtained by emulsion polymerization is not more than 0.1 μm (100 nm) unless a special treatment is given for the purpose, this being too small for a graft polymer as a material of a rubber-reinforced resin. Various methods have, therefore, been practiced or proposed for increasing the particle size of a rubber latex to the desired level. One is an approach to improve the polymerization method for increasing the particle size of the rubber latex, and the other is an approach to increasing the particle size of the rubber latex through the cohesion of small particle size rubber prepared by usual emulsion polymerization.

The former approach is for increasing the particle size in the course of polymerization under conditions of, for example, high polymer concentration and high-shear stirring for growth by the cohesion of rubber particle size. The greatest demerit of this method is the too long polymerization time, 50–100 hours for increasing the particle size to about 0.3 μm (300 nm), and this extremely low productivity can hardly be acceptable commercially.

The latter approach is for increasing the particle size through the cohesion of particles by lowering the stability of a rubber latex through the addition of some inorganic salt or acid. The particle size attainable by this method is 0.2 μm (200 nm) at largest, this being not proper for rubber-reinforced resins in most cases. An attempt to further increase the particle size by this method results in the formation of a large amount of clots, this being difficult to be practiced commercially.

An improvement of this method is disclosed in Japanese Laid-open Patent Publication No. 25655/'75. It is a method for increasing the particle size by adding to a rubber latex of not less than pH 7, an acid group-containing latex with its core made of a polyalkyl acrylate and its shell made of a copolymer of an alkyl acrylate and an unsaturated acid. By this method it is, indeed, possible to make rubbers large in particle size, 0.3 μm (300 nm) or so.

This method, however, caused the formation of a large amount of clots during the preparation of the acid group-containing latex, and the resultant lowering of production efficiency and troubles of disposal of the resulting wastes were problematic for commercial adoption thereof.

Lowering of the content of unsaturated acids for suppressing clot formation during the preparation of an acid group-containing latex itself results in lowering of a particle-growing potential, which gave rise to problems such as failure to increase the rubber particle size, increase of ungrown particles and deterioration of mechanical properties of thermoplastic resins.

After intensive studies for solving the aforementioned problems about the method of growing particles by the use of an acid group-containing latex the present inventors have found out that an acid group-containing latex of a specific composition of an unsaturated acid and an alkyl methacrylate reduces clot formation during the preparation, provides rubbers of large particle size and the rubber-reinforced thermoplastic resin made by the use thereof has a high impact strength, and thus arrived at the present invention.

DISCLOSURE OF THE INVENTION

The present invention relates, in a first aspect, to a rubber latex with its particles grown through cohesion by adding to 100 weight parts of (B) a rubber latex (solid), 0.1–15 weight parts (solid) of (A) an acid group-containing latex having an average particle size of 50–500 nm prepared by polymerizing a monomer mixture comprising (a), (b), (c) and (d) [(a)+(b)+(c)+(d)=100 weight %];

(a) 5–25 weight % of at least one unsaturated acid selected from the group consisting of acrylic acid, methacrylic acid, itaconic acid and crotonic acid, (b) 20–95 weight % of at least one alkyl methacrylate with its alkyl group 1–12 in carbon number, (c) 0–30 weight % of at least one alkyl acrylate with its alkyl group 1–12 in carbon number, (d) 0–40 weight % of at least one selected from the group consisting of aromatic vinyls, compounds having at least two polymerizable functional groups in a molecule and vinyl cyanides, copolymerizable with the aforementioned (a), (b) and (c).

The present invention relates, in a second aspect, to a graft copolymer made by graft-polymerizing onto 15–85 weight parts of the aforementioned rubber latex with its particles grown to not less than 200 nm in an average particle size, 85–15 weight parts of a monomer mixture of 70–100 weight % of at least one monomer selected from the group consisting of aromatic vinyls, vinyl cyanides and methacrylic esters and not more than 30 weight % of a monomer having a vinyl group copolymerizable with such monomers.

The present invention relates, in a third aspect, to a thermoplastic resin composition excellent in impact strength comprising the aforementioned graft copolymer and a thermoplastic resin.

BEST MODE FOR PRACTICING THE INVENTION

As the unsaturated acids (a) used for the preparation of the acid group-containing latex (A), there are included acrylic acid, methacrylic acid, itaconic acid and crotonic acid, particularly preferred being acrylic acid and methacrylic acid. These are usable singly or in combination of two or more.

As the alkyl methacrylates (b) with its alkyl group 1–12 in carbon number, there are usable esters of methacrylic acid and alcohols having a straight chain or side chains 1–12 in carbon number such as methyl methacrylate, ethyl methacrylate, propyl methacrylate, butyl methacrylate and 2-ethyl hexyl methacrylate, preferred being those having an alkyl group 1–8 in carbon number. These are usable singly or in combination of two or more.

As the alkyl acrylates (c) with its alkyl group 1–12 in carbon number, there are usable esters of acrylic acid and alcohols having a straight chain or side chains 1–12 in carbon number such as methyl acrylate, ethyl acrylate, propyl acrylate, butyl acrylate and 2-ethylhexyl acrylate, preferred being those having an alkyl group 1–8 in carbon number. These are usable singly or in combination of two or more.

As preferred monomers (d) copolymerizable with the aforementioned monomers (a), (b) and (c), these are included aromatic vinyls such as styrene α-methylstyrene and p-methylstyrene, particularly preferred being styrene and α-methylstyrene. These are usable singly or in combination of two or more.

As the other copolymerizable monomers (d), there are included compounds having at least two polymerizable functional groups such as allyl methacrylate, polyethylene glycol dimethacrylate, triallyl cyanurate, triallyl isocyanurate and triallyl trimellitate and vinyl cyanides such as acrylonitrile and methacrylonitrile. These ate usable singly or in combination of two or more.

In polymerizing the acid group-containing latex (A) it is advisable for reducing the amount of clots formed during the preparation of the acid group-containing latex and improving particle growability to first polymerize the monomer portion (A1), which is 5–40 weight %, preferably 8–35 weight % of (A), for a low-Tg copolymer of $-95°$ $C. \leq Tg \leq 40°$ C., preferably $-80°$ $C. \leq Tg \leq 30°$ C., and then polymerize the monomer portion (A2), which is the residual 95-60 weight %, preferably 92-65 weight % of (A), for a high-Tg copolymer of $-20°$ $C. \leq Tg \leq 80°$ C., preferably $-10°$ $C. \leq Tg \leq 70°$ C.

The proportion of the unsaturated acid (a) to the entire quantity of the acid group-containing copolymer is 5–25 weight %, preferably 8–23 weight %. If this proportion is less than 5 weight %, there is substantially no particle growability, while, if it is in excess of 25 weight %, clot formation or viscosity increase of latex takes place in the course of polymerization, this making the process not suited for commercial production.

In polymerizing the acid group-containing latex (A), it is advisable for improving particle growability to first polymerize 5–90 weight %, preferably 10–70 weight %, of a low unsaturated acid-content monomer portion (A3) and then polymerize the residual 95–10 weight %, preferably 90-30 weight %, of a high unsaturated acid-content monomer portion (A4) in such a manner that the weight ratio a/b of the content of unsaturated acids "a" in (A3) and that of unsaturated acids "b" in (A4) is in a range of 0.05–0.95. It is particularly preferable if a/b is 0.15–0.85.

For the improvement of particle growability the content of unsaturated acids in the monomer portion (A4) is preferred to be not less than 10 weight %, and especially preferred to be not less than 15 weight %.

The residual monomer copolymerized with unsaturated acids (a) is basically alkyl methacrylates (b). The proportion of the alkyl methacrylates (b) is 20–95 weight %, preferably 25–85 weight %, and outside this range the particle growability is lowered. The proportion of the alkyl acrylates (c) is 0–30 weight %, preferably 8–28 weight %. If this proportion exceeds 30 weight %, it results in an increase of clot formation during the production of the acid group-containing latex.

The quantity of the copolymerizable monomers (d) is 0–40 weight %, preferably 0–35 weight %. If it is in excess of 40 weight %, the particle growability is lowered.

In case of monomers having at least two polymerizable functional groups in a molecule, it is advisable to use them in a range of 0–3 weight %.

The acid group-containing latex (A) is preferably prepared by polymerizing (a) 5–25 weight % of the acrylic acid and/or methacrylic acid, (b) 20–85 weight % of at least one of the alkyl methacrylates with its alkyl group 1–8 in carbon number, (c) 0–30 weight % of at least one of the alkyl acrylates with its alkyl group 1–8 in carbon number and (d) 0–40 weight % of styrene and/or α-methylstyrene.

As the rubber latex (B), olefin-type and silicone-type rubbers are usable but particularly preferred is diene-type rubbers or acrylic ester-type rubbers, these being usable singly or in combination of two or more. As the diene-type rubber, polybutadienes, acrylonitrile-butadiene copolymers, styrene-butadiene copolymers, butyl acrylate-butadiene copolymers etc. are included, while as the acrylic ester-type rubbers, polybutyl acrylate rubbers and butyl acrylate-butadiene copolymers etc. are included. These may as well be used singly or in combination of two or more.

The acid group-containing latex (A) is prepared by emulsion polymerization. Emulsifiers used for the polymerization are mainly of sulfonic acid type or sulfuric ester type emulsifiers such as sodium alkylbenzene sulfonate, sodium paraffin sulfonate, sodium dialkylsulfosuccinate and sodium sodium alkyl sulfonate. It is also possible to use supplementally emulsifiers of carboxylic acid type. As this type of emulsifiers, there are used alkaline metal salts of higher fatty acids such as sodium oleate, sodium palmitate, potassium stearate, alkaline metal salts of rosin acid and alkaline metal salts of alkenylsuccinic acid. These are usable singly or in combination of two or more. These emulsifiers may preferably be added 0.5–5 weight parts to 100 weight parts of monomers. An emulsifier may be added in a lump at the beginning of polymerization or added partly at the beginning and supplement the residue in the course of polymerization intermittently or continuously. It is possible to adjust the particle size of the acid group-containing latex by changing the mode of adding the emulsifier.

The particle size of the acid group-containing latex is 50–500 nm, preferably 60–400 nm. If the particle size is less than 50 nm, the particle growability is low, while, if it is in excess of 500 nm, a marked increase of clot formation will result.

As polymerization initiators, those of a thermal decomposition type and Redox type are both usable. As specific examples of the former, potassium persulfate and ammonium persulfate may be included, while examples of the latter, cumene hydroperoxide-sodium formaldehyde sulfoxylate-iron salts are included. These may as well be used singly or in combination of two or more. The polymerization initiator may also be charged in a lump at the beginning of the polymerization or with part thereof added at the beginning, the remainder may be added intermittently or continuously. There is no limitation about the use of a chain transfer agent such as t-dodecyl mercaptan, n-dodecyl mercaptan and terpinolene for the molecular weight adjustment but it is advisable to use it 0.01–2 weight parts for the lowering of clot formation during the growth of particles.

In polymerization of the acid group-containing latex (A), the whole or part of the monomer mixture may be charged in a lump at the beginning of the polymerization or in the course of polymerization, or the residue may as well be charged intermittently or continuously, but preferred is continuous charging for the removal of heating. In case of the continuous charging, the composition of the monomer mixture to be charged is not required to be always the same.

There is no particular limitation, either, about pH of the rubber latex (B) but it is preferred to be not less than 7, especially preferred to be not less than 9, for enhancing particle growth. There is no particular limitation about rubber gelation but the degree of gelation is preferred to be not less than 70% with rubber mechanical properties taken into consideration. It is possible to use rubbers with no or a low degree of gelation in combination with rubbers with a high degree of gelation.

Particle growth can be accomplished by adding 0.1–15 weight parts (solid), preferably 0.3–12 weight parts of the acid group-containing latex (A) to 100 weight parts (solid) of the rubber latex (B). If the amount added of the acid group-containing latex is less than 0.1 weight part, particle growth by cohesion is substantially infeasible. If the amount added is in excess of 15 weight parts, there is a risk of unfavorable phenomenon such as increased formation of clots during particle growth.

There is no particular limitation, either, about the method of adding the acid group-containing latex (A) during the particle growth treatment. It may be added in a lump in a short time or may as well be added continuously and slowly.

The kind of the acid group-containing latex used for particle growth is not limited to one. It is possible to use more than one kind of the acid group-containing latexes different in particle growth capability for obtaining a particle-grown rubbers of two-peak distribution or wide particle size distribution.

There is no particular limitation about the treating temperature for particle growth but it is preferably 40–90° C. and more preferably 50–80° C. for enhancing particle growth rate.

In particle growth treatment, it is advisable for enhancing particle growth rate to use 0.01–5 weight parts, preferably 0.03–4 weight parts of an inorganic salt in addition to the acid group-containing latex. Addition of the inorganic salt is effective for improving the particle growth effect.

As the inorganic salts, alkaline metal salts such as sodium chloride and sodium sulfate and oxygen acid salts such as potassium alum are used, these being usable singly or in combination of two or more.

The pH for the particle growth treatment is acceptable if it is on the alkaline side (i.e. not less than pH 7) but for enhancing the growth rate it is advisable to raise it to pH 9 or above. For pH adjustment, one or more than one of 'sodium hydroxide, potassium hydroxide, sodium carbonate, sodium bicarbonate and the like may be used in proper amounts.

The rubber concentration of the rubber latex used for the particle growth, too, is an important factor. This rubber concentration is preferably 10–60 weight % and more preferably 15–50 weight %. The grown particle size is controllable through the adjustment of the rubber concentration. The final particle size distribution varies according to the composition of the acid group-containing latex, and the grown particle size becomes smaller when the rubber concentration is lowered and it becomes larger with increased formation of clots when the rubber concentration is raised.

It is also possible to add an emulsifier during the particle growth treatment so as to vary the surface coverage rate of the particles of rubber latex and to thereby vary the diameter of the grown particles. That is, the grown particle size can be made smaller than the case where no emulsifier is used, by using an emulsifier for increasing the surface coverage rate.

Preparation of a graft copolymer by the use of particle grown rubbers obtained by the above-described treatment is feasible by normal emulsion polymerization method. That is, 85-15 weight parts of a monomer or monomer mixture to be graft polymerized is charged in a lump or continuously in the presence of 15–85 weight parts (solid) of the particle-grown rubber latex and then the graft polymerization may be caused to proceed with the addition of a radical polymerization initiator. An emulsifier may be newly added for enhancing the progress of the graft polymerization. The polymerization initiator may be of a thermal decomposition type or a Redox type. The average particle size of the particle-grown rubber latex is preferably not less than 200 nm. If it is less than 200 nm, an effect of improving impact strength is scarcely noticeable.

The monomer to be used is selected with its compatibility with the thermoplastic resin taken into due consideration, since this is important when the graft polymer is blended with thermoplastic resins for the preparation of rubber reinforced resins. Specifically, when the thermoplastic resin is a styrene-acrylonitrile-type copolymer, it is preferred to be 70–100 weight % of at least one selected from the group consisting of aromatic vinyls, vinyl cyanides and methacrylic esters and not more than 30 weight % of monomers copolymerizable therewith.

Recovery of polymer powder from the graft copolymer latex after the completion of polymerization is feasible by a usual method, for example, by addition of an alkaline earth metal salt such as calcium chloride, magnesium chloride and magnesium sulfate, alkaline metal salt such as sodium chloride and sodium sulfate, and inorganic and organic salts such as hydrochloric acid, sulfuric acid, phosphoric acid and acetic acid to the latex for the coagulation thereof, followed by dehydration and drying. Spray drying is feasible, too.

Preparation of a rubber-reinforced thermoplastic resin composition is feasible by mixing the graft copolymer recovered in powder form with some other thermoplastic resin.

Instead of recovering the graft copolymer alone, it is also possible to blend the graft copolymer latex with the thermoplastic latex prepared by emulsion polymerization and then recovering the product in powder form by the aforementioned coagulation-and-dehydration method or spray drying method. It is also possible to blend the rubber-reinforced thermoplastic resin with some other thermoplastic resin for the preparation of a rubber-reinforced resin of a polymer alloy of said thermoplastic resin.

As the thermoplastic resins used in the present invention, there are included (1) a copolymer resin made of aromatic vinyls and vinyl cyanides, and further other monomers copolymerizable therewith, if necessary, (2) a copolymer resin made of aromatic vinyls, vinyl cyanides and N-substituted maleimides, and further other monomers copolymerizable therewith, if necessary, (3) a polymer alloy of a copolymer resin made of aromatic vinyls, vinyl cyanides and further other monomers copolymerizable therewith, if necessary, and polyvinyl chloride resins, (4) a polymer alloy of a copolymer resin made of aromatic vinyls, vinyl cyanides, and further other monomers copolymerizable therewith, if necessary, and polycarbonate resins, (5) a polymer alloy of a copolymer resin made of aromatic vinyls, vinyl cyanides and further other monomers copolymerizable therewith, if necessary, and polyester resins, (6) a polymer alloy of a copolymer resin made of aromatic vinyls, vinyl cyanides, unsaturated acids, and further other monomers copolymerizable therewith, if necessary, and polyamide resins.

As the aromatic vinyls in the copolymer resins (1) -(6) as aforementioned, styrene, α-methylstyrene, p-methylstyrene, chlorostyrene, bromostyrene etc. are included, as the vinyl cyanides, acrylonitrile, methacrylonitrile etc. are included, as the N-substituted maleimides, N-phenylmaleimide, N-butylmaleimide, N-hexylmaleimide etc. are included. Those are usable singly or in combination of two or more.

Specific examples of the thermoplastic resins, styrene-acrylonitrile copolymer resins, α-methylstyrene-styrene-acrylonitrile copolymer resins, for the copolymer resin (1), styrene-acrylonitrile-N-substituted maleimide copolymer resins for the copolymer resin (2), polymer alloys of styrene-acrylonitrile copolymer resins and polyvinyl chloride resins, polymer alloys of α-methylstyrene-styrene-acrylonitrile copolymer resins and polyvinyl chloride resins for the copolymer resin (3), polymer alloys of styrene-acrylonitrile copolymer resins and polycarbonate resins, polymer alloys of α-methylstyrene-styrene-acrylonitrile copolymer resins and polycarbonate resins for the copolymer resin (4), polymer alloys of styrene-acrylonitrile copolymer resins and and polyester resins, polymer alloys of α-methylstyrene-styrene-acrylonitrile copolymer resins and polyester resins for the copolymer resin (5), polymer alloys of styrene-acrylonitrile-methacrylic acid copolymer resins and polyamide resins, α-methylstyrene-styrene-acrylonitrile-methacrylic acid copolymer resins and polyamide resins for the copolymer resin (6).

As the polycarbonate resin of the aforementioned alloys, bisphenol A polycarbonates are included, as the polyester resin, polyethylene terephthalate, polybutylene terephthalate etc. are included, and as the polyamide resin, nylon 6, nylon 66, nylon 12 etc. are included.

When styrene-acrylonitrile copolymer is used, it is preferable to use a copolymer of a reduction viscosity of 0.30–1.00 dl/g (30° C., N,N-dimethylformamide solution), preferably 0.35–0.90 dl/g. If the reduction viscosity is outside the above range, workability and mechanical strength tend to be lowered.

As to the mixing proportion, it is preferred that the rubber proportion to the prepared composition is 5–35 weight %. If the rubber proportion is less than 5 weight %, an improvement of impact strength is insufficient. If its proportion exceeds 35 weight %, the degree of improvement in impact strength is relatively less with an inconvenience due to increased proportion of rubber, e.g. lowering of heat resistance and deterioration of workability being sometime noticeable.

Blending of resins is feasible by a usual method by the use of, for example, a Henschel mixer and a ribbon blender. First, powder of a graft copolymer or its blend with a thermoplastic resin is blended with powder, pellets or flakes of other thermoplastic resins and then the blended material is melt-kneaded by a kneader or an extruder.

Thus, the blended materials are to be melt-kneaded by an extruder or the like, and stabilizers, UV-adsorbents, lubricants, pigments and fillers may then be added, if necessary.

As stabilizers hindered phenol-type stabilizers, phosphoric stabilizers or sulfur-type stabilizers are suitable. These may be used singly or in combination of two or more.

As the hindered phenol stabilizers, there are included 1,1,3-tris (2-methyl-4-hydroxy-5-tert-butylphenyl-butane, n-octadecyl-3-(3',5'-di-tert-butyl-4-hydroxyphenyl) propionate, tetrakis [methylene-3 (3,5-di-tert-butyl-4-hydroxyphenyl) propionate] methane, triethylene glycol-bis-[3 (3-tert-butyl-5-methyl-4-hydroxyphenyl) propionate], pentaerythritol-tetrakis [3-(3,5-di-tert-butyl-4-hydroxyphenyl) propionate], 2,6-di-tert-butyl-4-methylphenol, 2,2'-methylene-bis (4-methyl-6-tert-butylphenol), 2,2'-methylene-bis (4-ethyl-6-tert-butylphenol, and tris-(3,5-di-tert-butyl-4-hydroxybenzyl)-isocyanurate).

As the sulfur-type stabilizers, there are included 3,3'-thiodipropionic acid, dialkyl-3,3'-thiodipropionate, pentaerythrityl-tetrakis (3-alkylthiopropionate), tetrakis [methylene-3-(alkylthio) propionate] methane, and bis [2-methyl-4-(3-alkyl-thiopropionyloxy)-5-tert-butylphenyl] sulfide.

As the phosphor-type stabilizers, there are included stearylphenylphosphite, tris (mono, di, nonylphenyl) phosphite, distearylpentaerythritoldiphosphite, tris (2,4-di-tert-butylphenyl) phosphite, di (2,4-di-tert-butylphenyl) pentaerythritoldiphosphite, tetrakis (2,4-di-tert-butylphenyl) 4,4-diphenylenephosphonite, and bis (2,6-di-tert-butyl-4-methylphenyl) pentaerythritoldiphosphite.

The above stabilizers are usable singly or in combination of two or more.

Hereinafter, the present invention will be described in greater detail with reference to Examples but these are mere examples and the invention is not limited thereby.

Unless otherwise specified, "part" means weight part and "%" means weight %.

Abbreviations:

BA: Butyl acrylate

MAA: Methacrylic acid tDM: Tertiary dodecyl mercaptan

CHP: Cumene hydroperoxide

EDTA: Ethylene diamine sodium tetraacetate

BMA: Butyl methacrylate

MMA: Methyl methacrylate

PBd: Polybutadiene

PBA: Butyl polyacrylate

AN: Acrylonitrile

St: Styrene

αMSt: α-methylstyrene

PMI: Phenylmaleimide

PVC: Polyvinyl chloride

Ny-6: Nylon 6

PC: Polycarbonate

PBT: Polybutylene terephthalate

A0-20: Trade name (hindered phenol-type stabilizer manufactured by Asahi Denka Co. Ltd.)

EBS: Ethylenebisstearylamide

HDT: Heat distortion temperature

TS: Tensile strength

EL: Elongation

IZOD: Izod impact strength

Measurement of physical properties of thermoplastic resin compositions, amount of clots, particle size of latex and Tg of copolymers was made by the following methods.

Impact strength was evaluated by IZOD test of ASTM D-256 (Unit: kg·cm/cm).

Tensile strength (TS) and tensile elongation (EL) were evaluated according to ASTM D-623 (Unit: kg/cm$^2$, EL=%).

Heat resistance (HDT) was evaluated as heat distortion temperature under the load of 18.6 kg/cm$^2$ according to ASTM D-648 (Unit: ° C.).

Workability (SPF: spiral flow) was measured with a 100B injection molding machine manufactured by Fanac Inc., and evaluation was made by the flowing length of the resin in a spiral-shaped mold 3 mm thick under conditions of 250° C. in cylinder temperature and 1,350 kg/cm$^2$ in injection pressure (Unit: mm).

In all these tests, the result is better when the test value is higher.

The amount of clots was evaluated by first filtering the latex through gauze, the clots on the gauze were dried in a drier and its weight % with respect to the quantity of the charged monomer or charged rubber was determined (Unit: weight %).

Latex particle size was measured by a UICOM particle size measuring instrument manufactured by Pacific Scientific Inc.

Tg of copolymers was calculated by Fox formula from Tg of homopolymers given in "Polymer Handbook."

EXAMPLES 1–23, COMPARATIVE EXAMPLES 1–4

(A) Preparation of acid group-containing latex

The following materials were charged into a reactor with a stirrer, a reflux condenser, a nitrogen inlet, a monomer inlet and a thermometer.

| | |
|---|---|
| Deionized water | 200 parts |
| Sodium dioctylsulfosuccinate | 0.2 part |
| Sodium formaldehyde sulfoxylate | 0.4 part |
| Sodium ethylenediaminetetraacetate | 0.01 part |
| Ferrous sulfate | 0.025 part |

The temperature in the reactor was raised to 65° C. in nitrogen current under stirring. When the temperature reached 65° C., dripping was started and the monomers (I) and (II) of Table 1 were continuously charged in 6 hours. The dripping rate was constant at a rate of 16.7 parts/hour.

Sodium dioctylsulfosuccinate was added 0.4 part after 1 hour and 3 hours of polymerization, respectively. Dripping over, stirring was continued for 1 hour at 65° C. until the completion of polymerization.

TABLE 1

| | | Acid-group containing latexes | | | |
|---|---|---|---|---|---|
| | | Examples | | | Comp. Ex. |
| | | A-1 | A-2 | A-3 | a-1 |
| Monomers I | MMA | 90 | 15 | — | — |
| | BA | — | — | 25 | — |
| | MAA | 10 | — | — | — |
| | St | — | 5 | — | 60 |
| | tDM | 0.2 | 0.04 | 0.12 | 0.12 |
| | CHP | 0.1 | 0.02 | 0.06 | 0.06 |
| Monomers II | MMA | — | 65 | — | — |
| | BMA | — | — | 60 | 35 |
| | BA | — | — | — | — |
| | MAA | — | 15 | 15 | 5 |
| | tDM | — | 0.16 | 0.08 | 0.08 |
| | CHP | — | 0.08 | 0.04 | 0.04 |
| Conversion (%) | | 98 | 97 | 99 | 95 |
| Average particle size (nm) | | 100 | 130 | 150 | 120 |

(B) Preparation of polybutadiene rubber

The following materials were charged into a 100-liter polymerizer.

| | |
|---|---|
| Deionized water | 200 parts |
| Potassium persulfate | 0.2 part |
| Tertiary dodecylmercaptan | 0.2 part |

The polymerizer interior was then evacuated and the followings were charged further.

| | |
|---|---|
| Sodium oleate | 1 part |
| Sodium rosinate | 2 parts |
| Butadiene | 100 parts |

The temperature was raised to 60° C. and the polymerization was started. The time required for polymerization was 12 hours and the conversion ratio was 96%. The rubber latex obtained was 70 nm in average particle size and its pH was 8.6.

(C) Preparation of polybutyl acrylate rubber

The following materials were charged into a reactor with a stirrer, a reflux condenser, a nitrogen inlet, a monomer inlet and a thermometer.

| | |
|---|---|
| Deionized water | 200 parts |
| Sodium palmitate | 2 parts |
| Sodium formaldehyde sulfoxylate | 0.4 part |
| Sodium ethylenediaminetetraacetate | 0.01 part |
| Ferrous sulfate | 0.0025 part |

The temperature in the reactor was raised to 65° C. in nitrogen current under stirring. When the temperature reached 65° C., dripping was started and the following mixture was continuously charged in 6 hours. Dripping over, stirring was continued for 1 hour at 65° C. until the polymerization was completed. The conversion ratio was 97%. The particle size of polybutyl polyacrylate latex after polymerization was 80 nm and its pH was 8.2.

| | |
|---|---|
| Butyl acrylate | 100 |
| Triallylcyanurate | 2 |
| Cumene hydroperoxide | 0.1 |

(D) Particle growth treatment

Particle growth treatment for the polybutadiene rubber obtained in (B) above and the polybutyl acrylate rubber obtained in (C) above was given as follows. As shown in Table 2, predetermined amounts of the acid group-containing latexes (A-1)~(A-3) and (a-1) obtained in (A) were added to the rubber latexes (B) and (C) at 25° C. and after heating to 60° C. in 40 min. under stirring, stirring was continued for 30 min. until the completion of particle growth.

TABLE 2

| | Grown rubber latexes | | | | |
|---|---|---|---|---|---|
| | Examples | | | | Comp. |
| | 1 D-1 | 2 D-2 | 3 D-3 | 4 D-4 | Ex. 1 d-1 |
| PBd | 100 | 100 | 100 | — | 100 |
| PBA | — | — | — | 100 | — |
| A-1 | 2 | — | — | — | — |
| A-2 | — | 4 | — | 3 | — |
| A-3 | — | — | 3 | — | — |
| a-1 | — | — | — | — | 3 |
| Grown average particle size (nm) | 220 | 320 | 400 | 320 | 70 |

Particle growth to not less than 200 nm was confirmed in every case except Comparative Example (d-1).

(E) Preparation of graft copolymer

The following materials were charged into a reactor with a stirrer, a reflux condenser, a nitrogen inlet, a monomer inlet and a thermometer.

| | |
|---|---|
| Deionized water | 280 parts |
| Particle grown rubber (solid) | Quantity given in Table 3. |
| Sodium dodecylbenzenesulfonate | 2 parts |
| Sodium formaldehyde sulfoxylate | 0.2 part |
| Sodium ethylenediaminetetraacetate | 0.01 part |
| Ferrous sulfate | 0.0025 part |

The temperature in the reactor was raised to 60° C. in nitrogen current under stirring. When the temperature reached 60° C., dripping was started and the mixture in Table 3 was continuously charged in 4 hours. Dripping over, stirring was continued for 1 hour at 60° C. until the completion of polymerization (E-1~E-5).

For comparison, the same graft copolymerization was carried out with ungrown particles of polybutadiene rubber latex (d-1), to obtain the graft copolymer (e-1).

TABLE 3

| | Graft copolymers (latexes) | | | | | |
|---|---|---|---|---|---|---|
| | Examples | | | | | Comp. |
| | 5 E-1 | 6 E-2 | 7 E-3 | 8 E-4 | 9 E-5 | Ex. 2 e-1 |
| D-1 | 70 | — | — | — | 70 | — |
| D-2 | — | 60 | — | — | — | — |
| D-3 | — | — | 50 | — | — | — |
| D-4 | — | — | — | 60 | — | — |
| d-1 | — | — | — | — | — | 70 |
| Ungrown particle PBd | — | — | — | — | — | — |
| St | 21 | 28 | 35 | 28 | 10 | 21 |
| AN | 9 | 12 | 15 | 12 | — | 9 |
| MMA | — | — | — | — | 20 | — |
| tDM | — | 0.4 | 0.2 | 0.4 | — | — |
| CHP | 0.3 | 0.1 | 0.1 | 0.1 | 0.3 | 0.3 |
| Conversion % | 91 | 89 | 88 | 88 | 92 | 92 |

(F) Preparation of thermoplastic resin latex

The materials and monomer (1) in Table 4 were charged into a reactor with stirrer, a reflux condenser, a nitrogen inlet, a monomer inlet and a thermometer.

| | |
|---|---|
| Deionized water | 200 parts |
| Sodium dioctylsulfosuccinate | 1.0 part |
| Sodium formaldehyde sulfoxylate | 0.4 part |
| Sodium etylenediaminetetraacetate | 0.01 part |
| Ferrous sulfate | 0.0025 part |

The temperature in the reactor was raised to 65° C. in nitrogen current under stirring. When the temperature reached 65° C., dripping was started and the monomer (II) of Table 4 was continuously charged in 6 hours. Sodium dioctylsulfosuccinate was added 0.5 part after 1 hour and 3 hours of polymerization, respectively. Dripping over, stirring was continued for 1 hour at 65° C. until the completion of polymerization (F-1~F-4).

The same polymerization was carried out using sodium palmitate as an emulsifier instead of sodium dioctylsulfosuccinate (F-5).

TABLE 4

| | | Termoplastic resins (latexes) | | | | |
|---|---|---|---|---|---|---|
| | | F-1 | F-2 | F-3 | F-4 | F-5 |
| Monomers I | αMSt | 75 | 70 | — | — | 75 |
| | St | — | — | — | — | — |
| | AN | — | — | — | — | — |
| | PMI | — | — | — | — | — |
| | tDM | 0.2 | 0.3 | — | — | — |
| | CHP | — | — | — | — | — |
| Monomers II | αMSt | — | — | — | — | — |
| | St | — | 5 | 71 | 63 | — |
| | AN | 25 | 20 | 29 | 17 | 25 |
| | PMI | — | — | — | 20 | — |
| | MAA | — | 5 | — | — | — |
| | tDM | 0.2 | 0.3 | 0.2 | 0.2 | 0.8 |
| | CHP | 0.3 | 0.3 | 0.1 | 0.3 | 0.3 |
| Conversion (%) | | 95 | 96 | 99 | 99 | 96 |

(G) Preparation of thermoplastic resin composition

After mixing the copolymer latex prepared in (E) and the thermoplastic resin latex prepared in (F) at the ratio shown in Table 5, 0.5 part of a phenol-type stabilizer was added and 2 parts of calcium chloride were added for coagulation. The coagulated slurry was dehydrated and dried and a thermoplastic resin was obtained in powder form (G-1~G-6, g-1).

TABLE 5

Thermoplastic resin compositions (powder)

| | Examples | | | | | | Comp. |
|---|---|---|---|---|---|---|---|
| | 10 G-1 | 11 G-2 | 12 G-3 | 13 G-4 | 14 G-5 | 15 G-6 | Ex. 3 g-1 |
| E-1 | 23 | — | — | — | — | 30 | — |
| E-2 | — | 33 | — | — | — | — | — |
| E-3 | — | — | 40 | — | — | — | — |
| E-4 | — | — | — | 33 | — | — | — |
| E-5 | — | — | — | — | 30 | — | — |
| e-1 | — | — | — | — | — | — | 33 |
| F-1 | 77 | — | — | — | — | — | — |
| F-2 | — | — | — | — | — | 70 | — |
| F-3 | — | 67 | — | 67 | — | — | 67 |
| F-4 | — | — | 60 | — | — | — | — |
| F-5 | — | — | — | — | 70 | — | — |

Then, the obtained thermoplastic resin powder was mixed with the additives or other thermoplastic resins shown in Table 6, the mixture was molten-kneaded in an extruder for the preparation of thermoplastic resin pellets and tests were made for the determination of physical properties such as heat distortion temperature (HDT), tensile strength (TS), elongation (EL), Izod impact strength (IZOD), falling weight impact strength and flowability.

The results of the test of physical properties are shown in Table 7. As seen from the tabulated data, the thermoplastic resin compositions of the present invention (H-1~H-8) are particularly excellent in impact strength, also having well-balanced good heat resistance and flowability (workability).

TABLE 6

Thermoplastic resin compositions

| | Examples | | | | | | | | Comp. |
|---|---|---|---|---|---|---|---|---|---|
| | 16 H-1 | 17 H-2 | 18 H-3 | 19 H-4 | 20 H-5 | 21 H-6 | 22 H-7 | 23 H-8 | Ex. 4 h-1 |
| G-1 | 100 | — | — | — | — | — | — | 50 | — |
| G-2 | — | 100 | — | — | — | — | 50 | — | — |
| G-3 | — | — | 100 | — | — | — | — | — | — |
| G-4 | — | — | — | 100 | — | — | — | — | — |
| G-5 | — | — | — | — | 50 | — | — | — | — |
| G-6 | — | — | — | — | — | 50 | — | — | — |
| g-1 | — | — | — | — | — | — | — | — | 100 |
| PVC | — | — | — | — | 50 | — | — | — | — |
| Ny-6 | — | — | — | — | — | 50 | — | — | — |
| PC | — | — | — | — | — | — | 50 | — | — |
| PBT | — | — | — | — | — | — | — | 50 | — |
| A0–20 | 0.2 | 0.2 | 0.2 | 0.2 | — | 0.2 | 0.2 | — | 0.2 |
| EBS | 1.0 | 1.0 | 1.0 | 1.0 | 1.0 | 1.0 | 1.0 | — | 1.0 |
| Sn stabilizer | — | — | — | — | 3 | — | — | — | — |

TABLE 7

Physical properties of thermoplastic resin compositions

| | | | Examples | | | | | | | | Comp. |
|---|---|---|---|---|---|---|---|---|---|---|---|
| | Measurement methods | Units | 16 H-1 | 17 H-2 | 18 H-3 | 19 H-4 | 20 H-5 | 21 H-6 | 22 H-7 | 23 H-8 | Ex. 4 h-1 |
| HDT | ASTM D-648 18.6 | °C. | 115 | 92 | 115 | 92 | 82 | 105 | 105 | 107 | 92 |
| TS | ASTM D-636 23° C. | kg/cm$^3$ | 510 | 450 | 480 | 480 | 450 | 510 | 550 | 530 | 430 |
| EL | ASTM D-636 23° C. | % | 15 | 22 | 16 | 11 | 32 | 14 | 52 | 20 | 8 |
| IZOD | ASTM D-256 23° C. | kg · cm/cm | 16 | 32 | 18 | 15 | 30 | 19 | 55 | 22 | 6 |
| Falling weight impact strength 1) | | kg · m | 4.2 | 7.6 | 4.0 | 5.3 | 8.2 | 8.8 | 9.1 | 7.6 | 1. |
| Workability 2) | | mm | 480 | 800 | 580 | 750 | 550* | 650 | 550 | 600 | 750 |

1) Weight: 4 kg Destruction energy was calculated from ½ destruction height.
2) Spiral flow 250° C. 1300 Kg/cm$^3$ 3 mm thickness
*Measurement temperature 190° C.

EXAMPLES 24–47, COMPARATIVE EXAMPLES 5–16

(A) Preparation of acid group-containing latex

Acid group-containing latexes for particle growth were prepared as follows.

The following materials were charged into a reactor with a stirrer, a reflux condenser, a nitrogen inlet, a monomer inlet and a thermometer.

| | |
|---|---|
| Deionized water | 200 parts |
| Sodium dioctylsulfosuccinate | 0.5 part |
| Sodium formaldehyde sulfoxylate | 0.3 part |

The temperature in the reactor was raised to 70° C. in nitrogen current under stirring. When the temperature reached 70° C., dripping was started and the monomers (I) and (II) of Table 8 were continuously charged in 5 hours. Dripping over, stirring was continued for 1 hour at 65° C. until the completion of polymerization (A-1~A-5, a-1~a-3).

| | |
|---|---|
| Sodium oleate | 1 part |
| Sodium rosinate | 2 parts |
| Butadiene | 100 parts |

The system temperature was raised to 60° C. and polymerization was started. Polymerization was completed 12 hours later and the conversion ratio was 96%. The rubber latex obtained was 70 nm in average particle size and 10.3 in pH.

(C) Preparation of polybutyl acrylate rubber

The following materials were charged into a reactor with a stirrer, a reflux condenser, a nitrogen inlet, a monomer inlet and a thermometer.

TABLE 8

Acid-group containing latex

| | | Examples | | | | | Comp. Examples | | |
|---|---|---|---|---|---|---|---|---|---|
| | | A-1 | A-2 | A-3 | A-4 | A-5 | a-1 | a-2 | a-3 |
| Monomers I | BA | 24 | 18 | — | 22 | 23 | — | 25 | 84 |
| | BMA | — | — | 24 | 2 | 2 | — | — | — |
| | St | — | 5 | — | — | — | 23 | — | — |
| | MAA | 1 | 2 | 1 | 1 | — | 2 | — | 16 |
| | tDM | 0.1 | 0.1 | 0.1 | — | 0.1 | — | — | — |
| | CHP | 0.03 | 0.03 | 0.03 | 0.03 | 0.03 | 0.03 | 0.03 | 0.1 |
| Monomers II | BA | 3 | 4 | 25 | — | 2 | — | 59 | — |
| | BMA | 58 | 58 | 37 | 44 | 58 | — | — | — |
| | St | — | — | — | 15 | — | 61 | — | — |
| | MAA | 14 | 13 | 13 | 16 | 15 | 14 | 16 | — |
| | tDM | 0.3 | 0.3 | 0.3 | — | 0.3 | — | — | — |
| | CHP | 0.08 | 0.08 | 0.08 | 0.08 | 0.08 | 0.08 | 0.08 | — |
| Characteristics | Tg-A1 (° C.) | −46 | −19 | −28 | −41 | −46 | 111 | −54 | −29 |
| | Tg-A2 (° C.) | 43 | 40 | 12 | 67 | 46 | 114 | −21 | — |
| | a/b | 0.21 | 0.46 | 0.69 | 0.19 | 0 | 0.43 | 0 | — |
| | Clots (%) | 0.1 | 0.1 | 0.1 | 0.2 | 0.1 | 0.2 | 5.7 | 6.3 |
| | Average particle size (%) | 110 | 120 | 90 | 120 | 100 | 110 | 90 | 80 |

(注 Tg-A1: Tg of copolymers comprised of monomer A1
Tg-A2: Tg of copolymers comprised of monomer A2

(B) Preparation of polybutadiene rubber

The following materials were charged into a 100-liter polymerizer.

| | |
|---|---|
| Deionized water | 200 parts |
| Potassium persulfate | 0.2 part |
| tDM | 0.2 part |

Then the following were additionally charged after evacuating the polymerizer interior by a vacuum pump.

| | |
|---|---|
| Deionized water | 200 parts |
| Sodium palmitate | 0.5 part |
| Sodium formaldehyde sulfoxylate | 0.4 part |
| Sodium ethylenediaminetetraacetate | 0.01 part |
| Ferrous sulfate | 0.0025 part |

The temperature in the reactor was raised to 65° C. in nitrogen current under stirring. When the temperature reached 65° C., dripping was started and the following mixture was continuously charged in 6 hours. 0.5 part of sodium paltimate was additionally charged after 1 hour of polymerization. Dripping over, stirring was continued for 1 hour at 65° C. until the completion of polymerization. The conversion ratio was 97%. The particle size of polybutyl acrylate latex after polymerization was 80 nm and its pH was 10.1.

| Butyl acrylate | 100 parts |
|---|---|
| Triallylcyanurate | 2 parts |
| Cumene hydroperoxide | 0.1 part |

(D) Particle growth treatment

Particle growth treatment of the polybutadiene rubber obtained in (B) and the polybutyl acrylate rubber obtained in (C) was carried out as follows.

The acid group-containing latexes (A-1)~(A-5) and (a-1)~(a-3) obtained in (A) in quantities shown in Table 9 were added in a lump to the rubber latexes (B) an (C) and stirring was continued for 1 hour for particle growth to proceed (D-1~D-7, d-1, d-3, d-4).

Growth of particle size to 300 nm or more and the reduced amount of clots were confirmed in examples.

(E) Preparation of graft copolymer

The following materials were charged into a reactor with a stirrer, a reflux condenser, a nitrogen inlet, a monomer inlet and a thermometer.

| Deionized water | 280 parts |
|---|---|
| Particle-grown rubber (solid) | Given in Table 10 |
| Sodium formaldehydesulfoxylate | 0.2 part |
| Sodium ethylenediaminetetraacetate | 0.01 part |
| Ferrous sulfate | 0.0025 part |

The temperature in the reactor was raised to 60° C. in nitrogen current under stirring. When the temperature reached 60° C., dripping was started and the monomer mixture shown in Table 10 was continuously charged in 4 hours. Dripping over, stirring was continued for 1 hour at 60° C. until completion of polymerization (E-1~E-7).

For comparison, the same graft copolymerization was carried out with ungrown particles of rubber latex (d-2), (d-5) to thus obtain graft copolymers (e-1, e-2).

TABLE 9

Grown rubber latexes

|  |  | Examples |  |  |  |  |  |  | Comp. Examples |  |  |  |  |
|---|---|---|---|---|---|---|---|---|---|---|---|---|---|
|  |  | 24 D-1 | 25 D-2 | 26 D-3 | 27 D-4 | 28 D-5 | 29 D-6 | 30 D-7 | 5 d-1 | 6 d-2 | 7 d-3 | 8 d-4 | 9 d-5 |
| Rubbers | PBd | 100 | 100 | 100 | 100 | 100 | 100 | — | 100 | 100 | 100 | 100 | — |
|  | PBA | — | — | — | — | — | — | 100 | — | — | — | — | 100 |
| Acid-group containing latexes | A-1 | 3 | 2 | — | — | — | — | 3 | — | — | 0.02 | 20 | — |
|  | A-2 | — | — | 3 | — | — | — | — | — | — | — | — | — |
|  | A-3 | — | — | — | 3 | — | — | — | — | — | — | — | — |
|  | A-4 | — | — | — | — | 3 | — | — | — | — | — | — | — |
|  | A-5 | — | — | — | — | — | 3 | — | — | — | — | — | — |
|  | a-1 | — | — | — | — | — | — | — | 3 | — | — | — | — |
|  | a-2 | — | — | — | — | — | — | — | — | — | — | — | — |
|  | a-3 | — | — | — | — | — | — | — | — | — | — | — | — |
| Characteristics | Grown rubber average particle size (nm) | 470 | 580 | 490 | 350 | 530 | 460 | 400 | — | (70)** | 100 | 1100 | (80)** |
|  | Clots (%) | 0.1 | 0.1 | 0.1 | 0.1 | 0.3 | 0.1 | 0.1 | 100* | — | 5.8 | 17.3 | — |

*Latex coagulated.
**Particle growth treatment was not appli

TABLE 10

Graft copolymers (latexes)

|  |  | Examples |  |  |  |  |  |  | Comp. Examples |  |
|---|---|---|---|---|---|---|---|---|---|---|
|  |  | 31 E-1 | 32 E-2 | 33 E-3 | 34 E-4 | 35 E-5 | 36 E-6 | 37 E-7 | 10 e-1 | 11 e-2 |
| Rubbers | D-1 | 60 | — | — | — | — | — | — | — | — |
|  | D-2 | — | 75 | — | — | — | — | — | — | — |
|  | D-3 | — | — | 60 | — | — | — | — | — | — |
|  | D-4 | — | — | — | 60 | — | — | — | — | — |
|  | D-5 | — | — | — | — | 75 | — | — | — | — |
|  | D-6 | — | — | — | — | — | 60 | — | — | — |
|  | D-7 | — | — | — | — | — | — | 50 | — | — |
|  | d-2 | — | — | — | — | — | — | — | 60 | — |
|  | d-5 | — | — | — | — | — | — | — | — | 50 |
| Monomers | St | 30 | 17 | 30 | 30 | 8 | 30 | 35 | 30 | 35 |
|  | AN | 10 | 8 | 10 | 10 | — | 10 | 15 | 10 | 15 |
|  | MMA | — | — | — | — | 17 | — | — | — | — |

TABLE 10-continued

| | | Graft copolymers (latexes) | | | | | | | |
|---|---|---|---|---|---|---|---|---|---|
| | | Examples | | | | | | Comp. Examples | |
| | | 31 | 32 | 33 | 34 | 35 | 36 | 37 | 10 | 11 |
| | | E-1 | E-2 | E-3 | E-4 | E-5 | E-6 | E-7 | e-1 | e-2 |
| tDM | | 0.1 | — | 0.1 | 0.1 | — | 0.1 | 0.2 | 0.1 | 0.2 |
| CHP | | 0.1 | 0.1 | 0.1 | 0.1 | 0.1 | 0.1 | 0.1 | 0.1 | 0.1 |

(F) Preparation of styrene-acrylonitrile-type copolymer latex

The following materials and monomers (I) shown in Table 11 were charged into a reactor with a stirrer, a reflux condenser, a nitrogen inlet, a monomer inlet and a thermometer.

| | |
|---|---|
| Deionized water | 200 parts |
| Sodium dioctylsulfosuccinate | 1.0 part |
| Sodium formaldehydesulfoxylate | 0.4 part |
| Sodium ethylenediaminetetraacetate | 0.01 part |
| Ferrous sulfate | 0.0025 part |

The temperature in the reactor was raised to 65° C. in nitrogen current under stirring. When the temperature reached 65° C., dripping was started and the monomer (II) was continuously charged in 6 hours. 0.5 part of sodium dioctylsulfosuccinate was additionally charged after 1 hour and 3 hours of polymerization, respectively. Dripping over, stirring was continued for 1 hour at 65° C. until the completion of polymerization (F-1~F-4).

TABLE 11

| | | Styrene-acrylonitrile copolymers (latexes) | | | |
|---|---|---|---|---|---|
| | | F-1 | F-2 | F-3 | F-4 |
| Monomers I | αMSt | 50 | — | — | — |
| | St | — | — | — | — |
| | AN | — | — | — | — |
| | PMI | — | — | — | — |
| | tDM | 0.1 | — | — | — |
| | CHP | — | — | — | — |

TABLE 11-continued

| | | Styrene-acrylonitrile copolymers (latexes) | | | |
|---|---|---|---|---|---|
| | | F-1 | F-2 | F-3 | F-4 |
| Monomers II | αMSt | 20 | 50 | — | — |
| | St | 5 | 20 | 65 | 70 |
| | AN | 25 | 30 | 15 | 30 |
| | PMI | — | — | 20 | — |
| | tDM | 0.2 | 0.3 | 0.3 | 0.2 |
| | CHP | 0.3 | 0.3 | 0.3 | 0.1 |
| Reduction viscosity (dl/g) | | 0.58 | 0.64 | 0.61 | 0.66 |

(G) Preparation of thermoplastic resin composition

The graft copolymer latex prepared in (E) and the styrene-acrylonitrile copolymer latex prepared in (F) were mixed at the ratio shown in Table 12 and after subsequent addition of 0.5 part of phenol-type stabilizer, 2 parts of calcium chloride was added for coagulation. The coagulated slurry was dehydrated and dried and a thermoplastic resin powder was thus obtained.

Then, 1 part of ethylenebisstearylamide was added to 100 parts of the resulting thermoplastic resin powder and the mixture was uniformly blended by a 20l blender manufactured by Tabata, Ltd., followed by melt-kneading of the same a 40 mm monoaxial extruder manufactured by Tabata, Ltd. for the preparation of thermoplastic resin pellets (H-1~H-10, h-1~h-5).

The resulting pellets were molded in a 100B injecting machine manufactured by Fanac Inc. at a cylinder temperature of 250–270° C. for the preparation of specimens for test of physical properties.

TABLE 12

Compositions and physical properties of thermoplastic resin compositions

| | | Examples | | | | | | | | | | Comp. Examples | | | | |
|---|---|---|---|---|---|---|---|---|---|---|---|---|---|---|---|---|
| | | 38 | 39 | 40 | 41 | 42 | 43 | 44 | 45 | 46 | 47 | 12 | 13 | 14 | 15 | 16 |
| | | H-1 | H-2 | H-3 | H-4 | H-5 | H-6 | H-7 | H-8 | H-9 | H-10 | h-1 | h-2 | h-3 | h-4 | h-5 |
| Graft | E-1 | 30 | — | — | — | — | — | — | 30 | 30 | 35 | — | — | — | — | — |
| copolymers | E-2 | — | 25 | — | — | — | — | — | — | — | — | — | — | — | — | — |
| | E-3 | — | — | 30 | — | — | — | — | — | — | — | — | — | — | — | — |
| | E-4 | — | — | — | 30 | — | — | — | — | — | — | — | — | — | — | — |

TABLE 12-continued

Compositions and physical properties of thermoplastic resin compositions

| | | Examples | | | | | | | | | | Comp. Examples | | | | |
|---|---|---|---|---|---|---|---|---|---|---|---|---|---|---|---|---|
| | | 38 H-1 | 39 H-2 | 40 H-3 | 41 H-4 | 42 H-5 | 43 H-6 | 44 H-7 | 45 H-8 | 46 H-9 | 47 H-10 | 12 h-1 | 13 h-2 | 14 h-3 | 15 h-4 | 16 h-5 |
| | E-5 | — | — | — | — | 25 | — | — | — | — | — | — | — | — | — | — |
| | E-6 | — | — | — | — | — | 30 | — | — | — | — | — | — | — | — | — |
| | E-7 | — | — | — | — | — | — | 40 | — | — | — | — | — | — | — | — |
| | e-1 | — | — | — | — | — | — | — | — | — | — | 30 | 30 | 30 | 35 | — |
| | e-2 | — | — | — | — | — | — | — | — | — | — | — | — | — | — | 40 |
| Styrene | F-1 | 70 | 75 | 70 | 70 | 75 | 70 | 60 | — | — | — | 70 | — | — | — | 60 |
| acrylonitrile | F-2 | — | — | — | — | — | — | — | 70 | — | — | — | 70 | — | — | — |
| copolymers | F-3 | — | — | — | — | — | — | — | — | 70 | — | — | — | 70 | — | — |
| | F-4 | — | — | — | — | — | — | — | — | — | 65 | — | — | — | 65 | — |
| EBS | | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Characteristics | IZOD | 23 | 20 | 22 | 22 | 17 | 24 | 14 | 31 | 21 | 40 | 4 | 6 | 3 | 8 | 3 |
| | EL | 22 | 17 | 20 | 20 | 16 | 23 | 12 | 28 | 20 | 20 | 5 | 7 | 3 | 10 | 4 |
| | TS | 470 | 490 | 460 | 480 | 480 | 475 | 420 | 440 | 510 | 450 | 480 | 450 | 520 | 460 | 410 |
| | HDT | 111 | 113 | 11 | | | 112 | 106 | 104 | 115 | 92 | 110 | 104 | 115 | 92 | 105 |
| | SPF | 440 | 435 | 44 | | | 440 | 540 | 550 | 570 | 820 | 430 | 550 | 560 | 810 | 530 |

From the test results shown in Tables 1–12, it is apparent that the rubber latexes of the present invention represented in the examples are less subject to clot formation during the preparation of an acid group-containing latex and particle growth treatment, and the graft copolymer and thermoplastic compositions containing it are particularly excellent in impact strength, being also good in heat resistance and workability.

Possibility of Industrial utilization:

The particle grown rubber latex of the present invention, the graft copolymer containing it and the thermoplastic resins incorporating such graft copolymer are particularly excellent in impact strength, being also good in heat resistance and workability.

What is claimed is:

1. A rubber latex having particles of an average particle size of not less than 200 nm grown through cohesion by adding 0.1–15 weight parts, in terms of solid content, of an acid group-containing latex (A) having an average particle size of 50–500 nm to 100 weight parts, in terms of solid content, of a rubber latex (B), wherein said acid group-containing latex (A) is prepared by polymerizing a monomer mixture comprising (a), (b), (c) and (d), the sum of (a), (b), (c) and (d) being equal to 100 weight percent:
(a) 5–25 weight % of at least one unsaturated acid selected from the group consisting of acrylic acid, methacrylic acid, itaconic acid, and crotonic acid,
(b) 20–95 weight % of at least one alkyl methacrylate having a $C_{1-12}$ alkyl group,
(c) 0–30 weight % of at least one alkyl acrylate having a $C_{1-12}$ alkyl group,
(d) 0–40 weight % of at least one monomer copolymerizable with (a), (b) and (c), and selected from the group consisting of aromatic vinyls, compounds having at least two polymerizable functional groups in a molecule, and vinyl cyanides, wherein said acid group-containing latex (A) is made by first polymerizing a monomer portion (A1), which is 5–40 weight % of (A), to obtain a copolymer having a glass transition temperature from −95° C. to 40° C., and then polymerizing a monomer portions (A2), which is the residual 95-60 weight % of (A), to obtain a copolymer having a glass transition temperature from −20° C. to 80° C., wherein the glass transition temperature of (A1) is lower than the glass transition temperature of (A2).

2. The rubber latex according to claim 1, wherein said acid group-containing latex (A) is made by first polymerizing a saturated acid-containing monomer portion (A3), which is 5–90 weight % of (A), and then polymer a saturated acid-containing monomer portion (A4), which is the residual 95-10 weight % of (A), such that the proportion of unsaturated acid content "a" of (A3) to unsaturated acid content "b" of (A4), expressed as a/b, is 0.05–0.95.

3. The rubber latex according to claim 2, wherein said acid group-containing latex (A) is so polymerized that the unsaturated acid content of said monomer portion (A4) is not less than 10 weight %.

4. The rubber latex according to claim 1, wherein said rubber latex is a diene rubber latex or an acrylic ester rubber latex or a mixture thereof.

5. The rubber latex according to claim 1, wherein said acid group-containing latex (A) is made by polymerizing (a) 5–25 weight % of acrylic acid and/or methacrylic acid, (b) 20–85 weight % of at least one alkyl methacrylate having a $C_{1-8}$ alkyl group, (c) 0–30 weight % of at least one alkyl acrylate having a $C_{1-8}$ alkyl group, and (d) 0–40 weight % of styrene and/or α-methyl styrene.

6. A graft copolymer made by graft-polymerizing onto 15–85 weight parts of a rubber latex according to any of claims 1–5, 85-15 weight parts of a monomer mixture of (i) 70–100 weight % of at least one monomer selected from the group consisting of aromatic vinyls, vinyl cyanides, and methacrylic esters, and (ii) not more than 30 weight % of at least one monomer having vinyl groups which is copolymerizable with monomer (i).

7. A thermoplastic resin composition comprising a graft copolymer according to claim 6 and a thermoplastic resin.

8. The thermoplastic resin composition according to claim 7, wherein said thermoplastic resin is a copolymer resin made of aromatic vinyls and vinyl cyanides, or a copolymer resin made of aromatic vinyls, vinyl cyanides, and at least one other monomer copolymerizable therewith.

9. The thermoplastic composition according to claim 8, wherein said copolymer resin is a styrene- and acrylonitrile-containing copolymer having a reduced viscosity of 0.3–1.00 dl/g, as measured at 30° C. in N,N-dimethylformamide solution.

10. The thermoplastic resin composition according to claim 7, wherein said thermoplastic resin is a copolymer resin made of aromatic vinyls, vinyl cyanides, and N-substituted maleimides, or a copolymer resin made of aromatic vinyls, vinyl cyanides, N-substituted maleimides, and at least one other monomer copolymerizable therewith.

11. The thermoplastic resin composition according to claim 7, wherein said thermoplastic resin is a polymer alloy of a copolymer resin made of aromatic vinyls and vinyl cyanides, or a copolymer resin made of aromatic vinyls, vinyl cyanides, and at least one other monomer copolymerizable therewith, and a polyvinyl chloride resin.

12. The thermoplastic resin composition according to claim 7, wherein said thermoplastic resin is a polymer alloy of a copolymer resin made of aromatic vinyls and vinyl cyanides, or a copolymer resin made of aromatic vinyls, vinyl cyanides, and at least one other monomer copolymerizable therewith, and a polyvinyl carbonate resin.

13. The thermoplastic resin composition according to claim 7, wherein said thermoplastic resin is a polymer alloy of a copolymer resin made of aromatic vinyls and vinyl cyanides, or a copolymer resin made of aromatic vinyls, vinyl cyanides, and at least one other monomer copolymerizable therewith, and a polyester resin.

14. The thermoplastic resin composition according to claim 7, wherein said thermoplastic resin is a polymer alloy of a copolymer resin made of aromatic vinyls, vinyl cyanides, and unsaturated acids, or a copolymer resin made of aromatic vinyls, vinyl cyanides, unsaturated acids, and at least one other monomer copolymerizable therewith, and a polyamide resin.

* * * * *